UNITED STATES PATENT OFFICE.

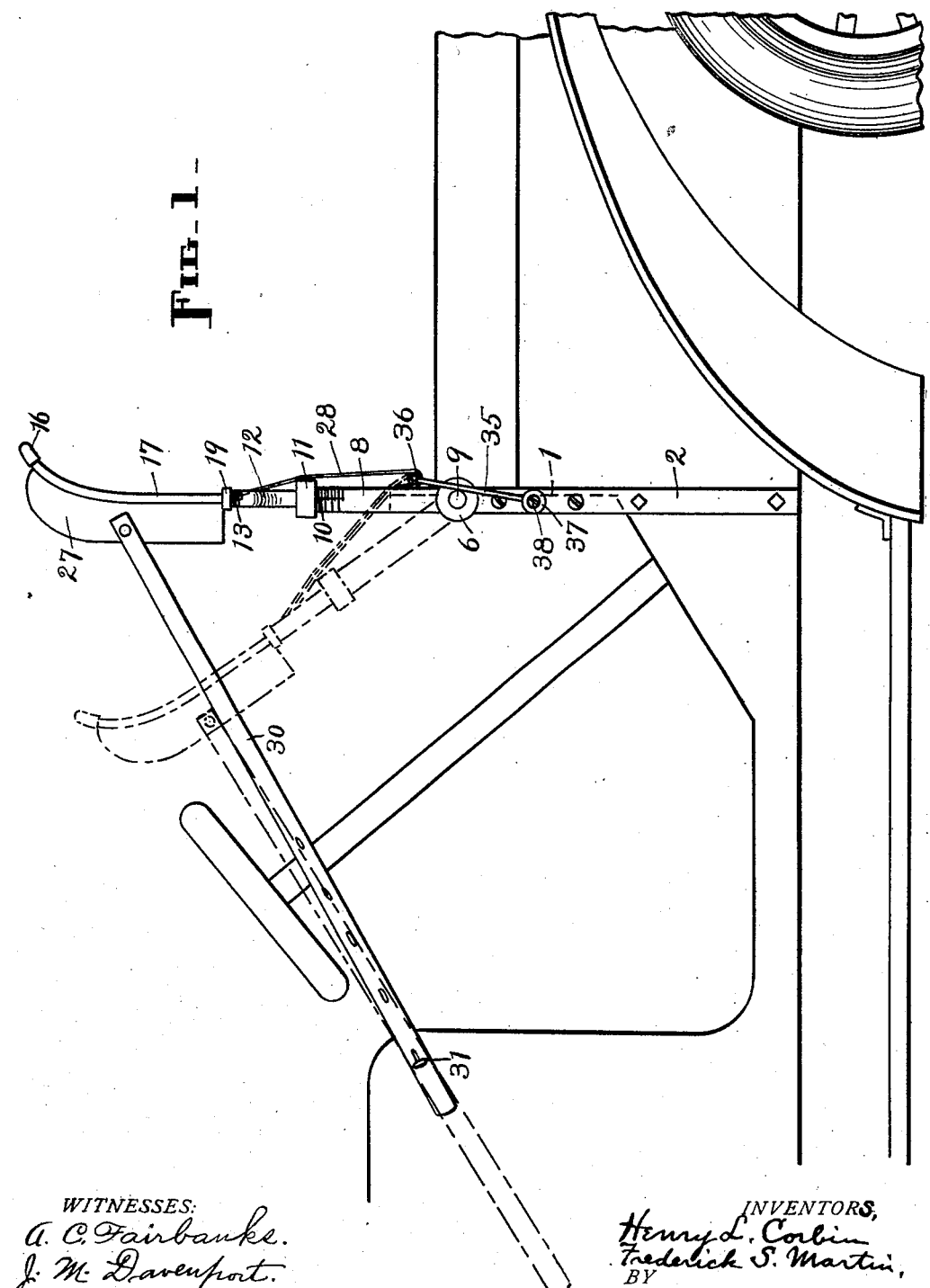

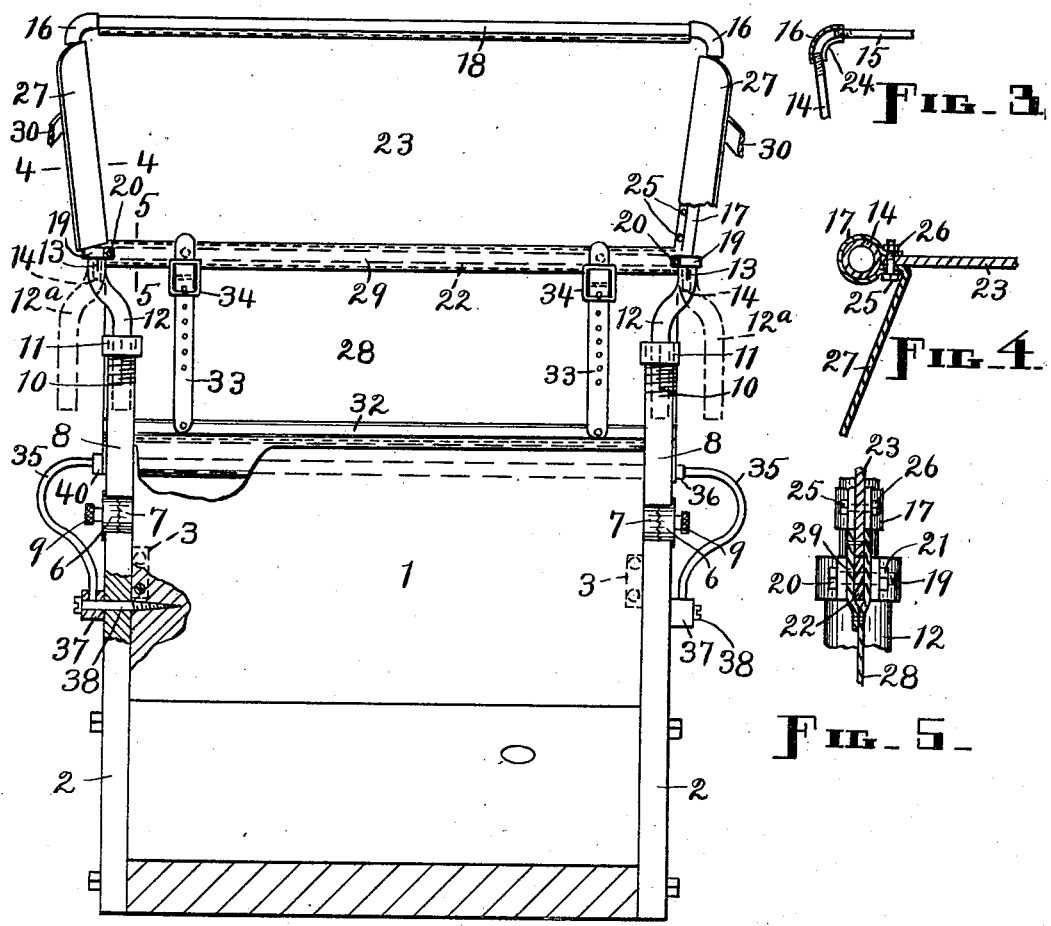

HENRY L. CORBIN AND FREDERICK S. MARTIN, OF SPRINGFIELD, MASSACHUSETTS.

WIND-SHIELD.

999,631. Specification of Letters Patent. Patented Aug. 1, 1911.

Application filed April 14, 1910. Serial No. 555,477.

*To all whom it may concern:*

Be it known that we, HENRY L. CORBIN and FREDERICK S. MARTIN, both citizens of the United States of America, and residents of Springfield, in the county of Hampden and State of Massachusetts, have invented a new and useful Wind-Shield, of which the following is a specification.

Our invention relates to improvements in attachments commonly known as wind shields, for vehicles such as automobiles, and consists essentially of a certain peculiar adjustable frame and correlated parts and members, all as hereinafter set forth.

The objects of our invention are, first, to produce a device or appliance of the class designated above which can be readily attached to the dash-board or other part or parts of a vehicle in front of the position occupied by the driver or operator of such vehicle and so arranged as to effectively shield and protect said driver or operator, and other occupant if any of the seat immediately back of said appliance, from wind, rain or snow, and dust, and this without obscuring the view of the road over which the vehicle is passing; second, to provide a shield of this kind which is applicable to a vehicle having a dash-board or other support for such shield of almost any width; third to afford ample means of adjustment for the shield whereby it is adaptable, not only to various widths of supporting means therefor, but to different heights and angles so as to meet any and all requirements on the part of the person using the same, and, fourth, to provide a wind shield that is strong and durable yet simple in construction, capable of being easily applied and easily and quickly adjusted, and is withal practicable and efficient.

Other objects will appear in the course of the following description.

We attain these objects by the means illustrated in the accompanying drawings, in which—

Figure 1 is a side elevation of a portion of an automobile car equipped with a practical form of our wind shield, two positions of that portion of said shield which has backward adjustment being shown; Fig. 2, a rear elevation of the shield shown mounted on the car as before, portions of the dashboard of said car and of said shield being broken off or severed and broken away to disclose clearly parts that would otherwise be obscured, and the extreme outward positions of the longitudinal and rotary adjustable tubular members being indicated by dot-and-dash lines; Fig. 3, a detail of one corner of the curtain-frame, the covering members of such frame being omitted and the elbow being in section; Fig. 4, an enlarged section on lines 4—4, looking down, in Fig. 2; Fig. 5, an enlarged section on lines 5—5, looking toward the left, in Fig. 2; Fig. 6, a detail of one corner of the apron bail, and, Fig. 7, a vertical section through the left-hand serrated joint.

Similar figures refer to similar parts throughout the several views.

Although, as previously intimated, this invention is applicable to various kinds of dash-boards, either with or without filling-in boards, and to other parts of automobile cars, we have illustrated it in connection with a simple dash-board 1, to the vertical edges of which and to the sides of the car below such edges the fixed parts of the shield are attached. These fixed parts consist of two vertical bars 2 which are screwed or bolted to the dash-board 1 and to the sides of the car, as just explained. Preferably the bars 2 are provided with inwardly-extending flanges or lugs 3 which project in front of the dash-board 1 and are screwed thereto for the sake of greater security, the strength and firmness of the connections between said bars and said dashboard being considerably augmented thereby. Each bar 2 has formed thereon at the upper end a round flat hub 6 which is serrated on its inner face, has a central opening therethrough, and is located adjacent to the outer edge of said bar with its axis horizontal and parallel with the dash-board.

The upper or body portion of the shield is articulated to the bars 2 at the hubs 6, through the medium of similar hubs 7 at the bases of two sockets 8, and of two bolts or hand-screws 9. The sockets 8 are tubular and have the hubs 7 at their lower ends adjacent to the outer edges of said sockets. The hand-screws 9 pass through the central openings in the hubs 6 into threaded engagement with alining openings in the hubs 7. It is now clear that adjustment of the sockets 8 is effected by simply loosening the hand-screws 9 sufficiently to enable the teeth on the hubs 7 to pass the teeth on the hubs 6, rocking said sockets on said hand-screws and on the bearings afforded by the contacting parts to adjust them at whatever angle relative to the bars 2 as may be desired, and retightening said screws, the latter operation forcing the contiguous teeth into engagement and thus securely holding said sockets in place on said bars. These joints are simple but effective. The sockets 8 are split longitudinally at their upper terminals, as shown at 10, and such terminals are externally screw-threaded to receive nuts 11—11. A socket 12 having a compound bend therein is provided to fit into the upper end of each socket 8 where it is held tightly by the split terminals of such last-mentioned socket and the nut 11 thereon in the manner usual to such holding means. It is thus seen that the sockets 12 are adjustable both vertically and about the longitudinal center of the sockets 8. It is necessary to make the sockets 12 in the compound bent form mentioned and substantially as shown so as to enable them to accommodate themselves to the sockets 8, whether the latter be located farther apart or closer together according to the location of the bars 2, and at the same time support the curtain-frame described below, it being remembered that the space between said bars is dependent on the width of the dash-board or other supporting part or parts of the car. Arranged as shown in full lines, in Fig. 2, the sockets 12 are adjusted inwardly as far as possible, while the dot-and-dash lines 12$^a$, in such view, show the extreme outward displacement or adjustment of such sockets. Between these two extremes the sockets 12 can be adjusted to meet any requirement incident to the separation of the sockets 8. The before-mentioned curtain-frame and the parts supported thereby can be readily raised or lowered, to adjust them at the proper height relative to the sockets 8, when the nuts 11 are unscrewed. The upper terminals of the sockets 12 are split longitudinally, at 13, similarly to the sockets 8 and for the same purpose.

The curtain-frame which we prefer to employ is made up of two side pieces 14 and a top piece 15 connected by two elbows 16 with said side pieces, a holder 17 on each of said side pieces, which in cross-section is in the form of an ordinary clip, and a holder 18 on said top-piece. The side-pieces 14 extend below the holders 17 and are received into the upper split ends of the sockets 12, where they are rigidly secured by means of two clips 19 on such ends and the same number of bolts 20 through the lips of such clips and nuts 21 on such bolts, together with a cross-bar 22 which with other parts not yet mentioned serves as the bottom of the curtain-frame.

An upper curtain 23 has its ends introduced between the lips of the holders 17 and its upper edge introduced between the lips of the holder 18, while the upper corners of said curtain are received into slots 24 in the hubs 16. The holders 17 are fastened around the side pieces 14 and to the curtain 23 by means of bolts 25 and nuts 26, and two flaps 27 are also attached to the curtain-frame by the same means, the inner edges of such flaps being received between the back side of said curtain and the rear lips of said holders. The holder 18, if of fabric as it may be, is fastened around the top piece 15 and to the curtain 23 by stitching instead of bolts and nuts. The bottom of the curtain 23 rests on the upper edge of the cross-bar 22, and a lower curtain or apron 28 depends from said cross-bar. The apron 28 and a covering strip 29 extend above the cross-bar 22 on both sides of the curtain 23 and all are stitched together, and said apron and strip are also stitched together under said bar. These stitched parts may be received with the ends of the cross-bar 22 between the lips of the clips 19 and the bolts 20 passed through all. A strap 30 extends rearwardly from each flap 27 to a fastener 31 on the side of the car. These straps assist in holding and steadying the shield in the usual manner. The bottom of the apron 28 is stiffened by means of a bar 32, and to this stiffened part of the apron are attached two straps 33. Two buckles 34 are fastened back of the apron to the cross-bar 22 and in line with the straps 33.

To serve as a support or bottom anchorage for the apron 28 below we provide a bail made of end pieces 35—35 and a connecting piece 36, said end pieces having hubs 37 at their free terminals which hubs are loosely mounted on suitable studs or screws 38 projecting outwardly from the bars 2 below the hand-screws 9. The location of the screws 38 and the length or height of the end pieces 35 are such that the connecting piece 36 is situated below the top of the dash-board 1, and said connecting piece is in front of said dash-board and also in front of the sockets 8 when the bail is turned up in its operative position. The bail is pivotally mounted so as to facilitate the connecting of the apron 28 therewith. In order to render the bail adjustable so that it can be applied to the fixed supports of the shield whatever distance they may be apart, the connecting piece 36 is made tubular with a split terminal 39, to receive the horizontal arm of one of the end pieces 35, and provided with an external nut 40, the construction being similar to that of the sockets 8 with their nuts 11. By loosening the nut 40 and moving the adjustable end piece 35 in or out of the connecting piece 36 and then retightening said nut, the length of the bail is decreased or increased accordingly.

After the other parts of the shield have been put in place and properly adjusted and secured, the apron 28 is carried under and brought up behind the connecting piece 36 of the bail, and the straps 33 are passed through the buckles 34, drawn tight and fastened. In this way the bail is held in an approximately upright position and the apron is fastened securely in place, thus completely closing, with the upper curtain, the space between the top of the dash-board and the top of the curtain-frame. The apron and the straps 33 should be of sufficient length to allow for different distances between the bail and the cross-bar 20. A wider apron than that shown may be employed without requiring any change to be made in the construction of the bail or other parts of the shield, as will readily be perceived, and such wider apron may be desired in cases where the maximum or approximately maximum separation of the bars 2 and sockets 8 obtains.

From the foregoing will be understood the manner in which the shield is applied and its several adjustments are effected, together with the use and practicability of the same, so that further description thereof is not deemed necessary beyond calling attention to the fact that said shield is frequently not to say generally tilted backwardly, that is, so much of it is thus tilted as has the hand-screws 9 for its axes, as represented by dot-and-dash lines in the first view. When properly adjusted in this way to meet the requirements of the occupant or occupants of the seat behind the shield, an unobstructed view is had over the top of said shield, yet at the same time the air currents are deflected upwardly so that they pass above the heads of such occupants whose faces and eyes are thus amply protected. To facilitate the upward flow of the air currents and render such flow more pronounced, the upper portions of the curtain-frame and curtain are curved forwardly or upwardly according to the arrangement or adjustment of the shield, as best shown in Fig. 1. As a matter of fact this curve in the upper portion of the shield tends positively to change the air currents and divert them to such an extent that they pass at an appreciable height above the occupant or occupants of the car.

The curtain 23 is generally made of celluloid or some other transparent material so that it can be seen through without difficulty, although if the shield were always to be used with its upper portion inclined or tilted in the manner described in the preceding paragraph such curtain might consist of opaque material such as fabric or leather. One of these latter materials is generally employed for the flaps 27, also for the apron.

We do not limit ourselves to the particular construction herein shown and described, because as is obvious there are many modifications of the same, especially in matters of detail, that may be made without departing from the spirit of our invention.

What we claim as our invention, and desire to secure by Letters Patent, is—

1. The combination, in a wind shield, of bars adapted to be attached to suitable supporting parts of a vehicle, supporting members articulated for backward and forward adjustment to said bars, supporting members, each having a compound bend therein, mounted on said articulated members, and a curtain-frame secured to said last mentioned supporting members.

2. A wind shield comprising bars adapted to be attached to suitable supporting parts of a vehicle, a curtain-frame and a curtain, supporting members for such frame and curtain, such frame-supporting members being mounted on said bars and provided with means for varying the width between them, an apron, fastening means for adjacent edges of said curtain and apron, a bail attached to said bars to form an anchorage for said apron, means to adjust the length of said bail to adapt it to the width of said frame-supporting members, and means to adjust said frame-supporting members on said bars backward and forward and secure them.

3. A wind shield comprising bars adapted to be attached to suitable supporting parts of a vehicle, frame-supporting members mounted on said bars and consisting in part of rotatably adjustable members having compound bends therein to provide lateral adjustment, means to adjust said frame-supporting members forward and backward and to secure them in position, a curtain frame and a curtain mounted on said frame-supporting members and consisting in part of a cross-bar clamped to said members and having said curtain attached at the bottom thereto, an apron attached at the top to said cross-bar, and an endwise-adjustable bail to form an anchorage for said apron at the bottom, said bail also being attached to said first-mentioned bars.

4. A wind shield comprising bars adapted to be attached to suitable supporting parts of a vehicle, frame-supporting members mounted on said bars and consisting in part of rotatably adjustable members having compound bends therein to provide lateral adjustment, means to adjust said frame-supporting members forward and backward and secure them in position, a curtain-frame and a curtain mounted on said frame-supporting members and consisting in part of a cross-bar clamped to said members and having said curtain attached at the bottom thereto, an endwise-adjustable bail also attached to said first-mentioned bars, an apron attached at the top to said cross-bar, and straps and buckles on said apron adapted to hold the latter tight after being passed under said bail.

HENRY L. CORBIN.
FREDERICK S. MARTIN.

Witnesses:
F. A. CUTTER,
A. C. FAIRBANKS.

Copies of this patent may be obtained for five cents each, by addressing the "Commissioner of Patents, Washington, D. C."